UNITED STATES PATENT OFFICE.

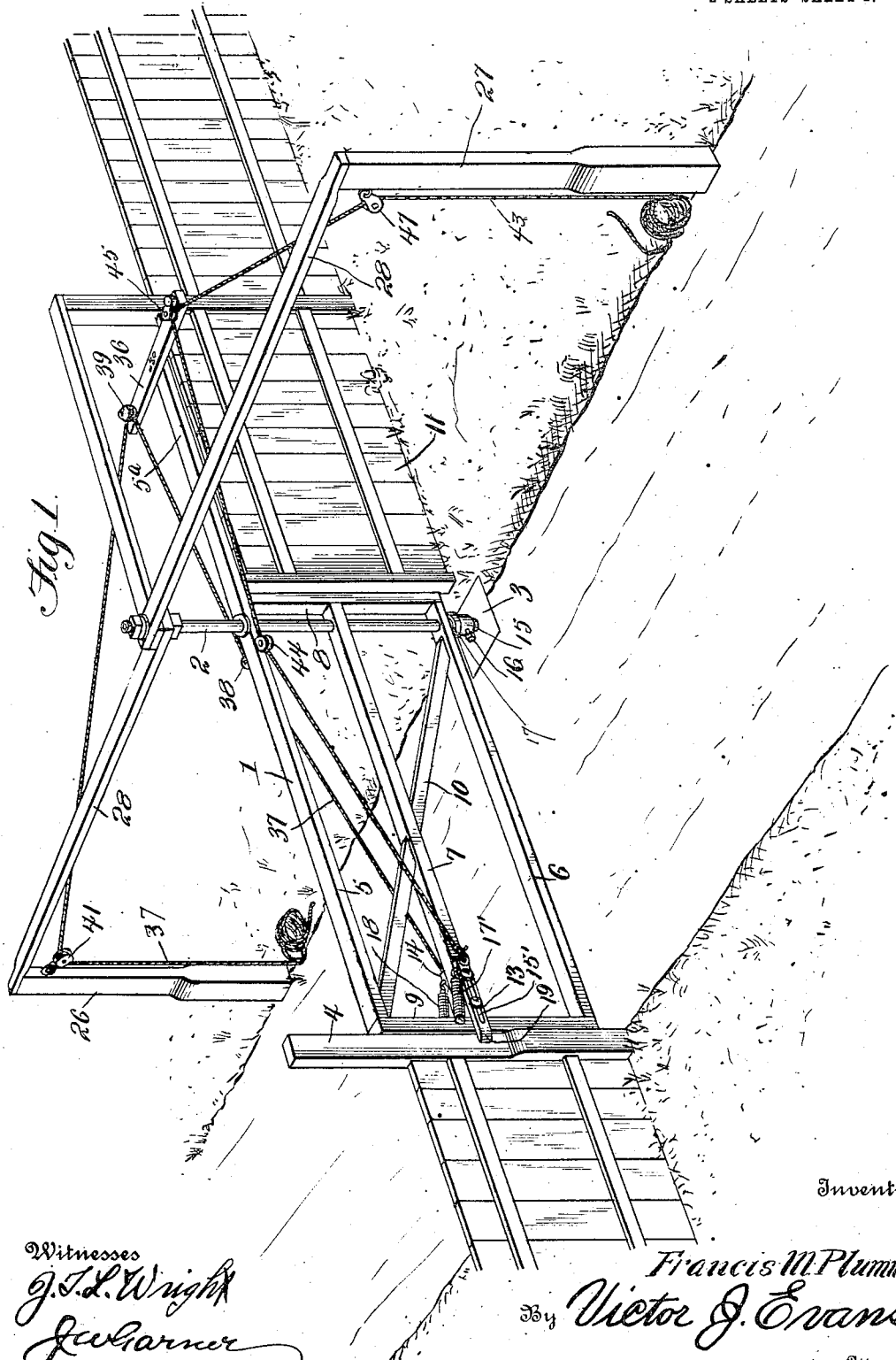

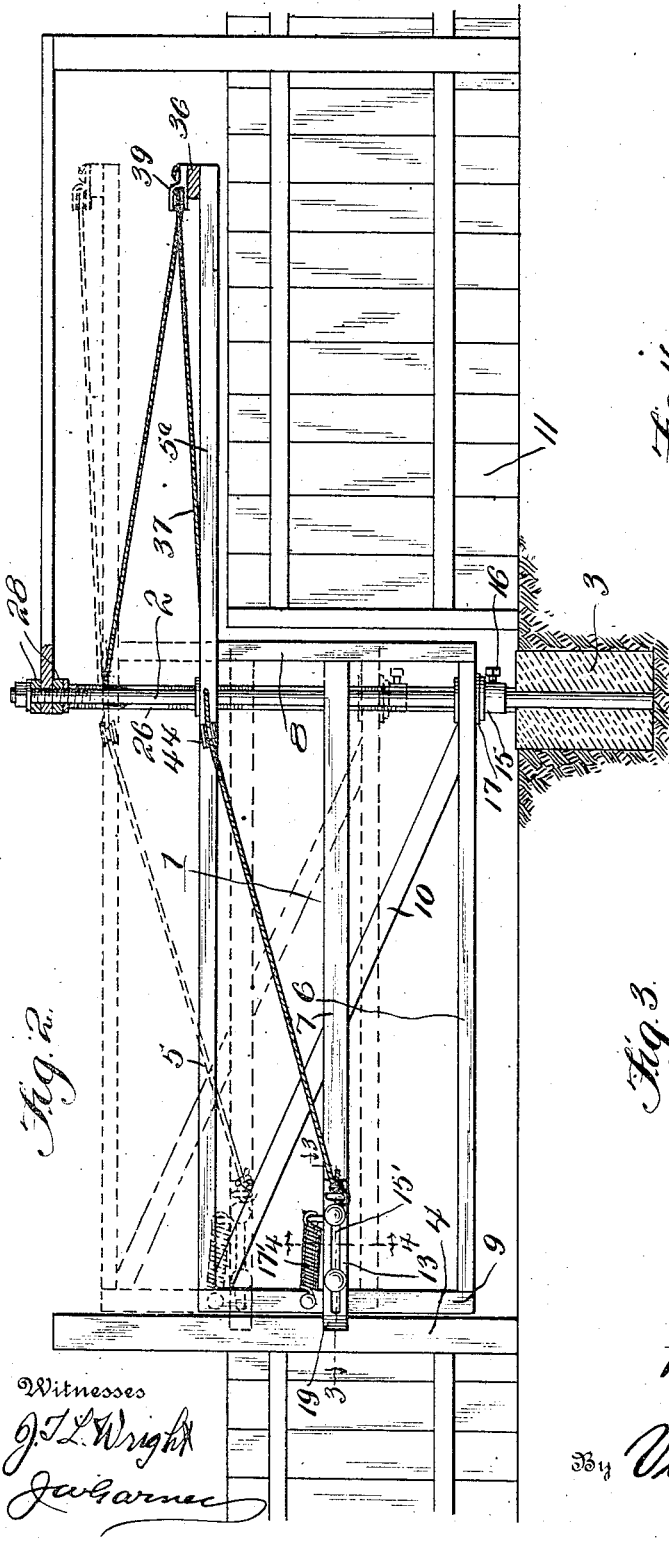
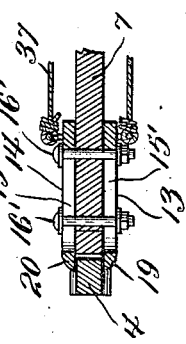

FRANCIS MARRION PLUMMER, OF LYLE, WASHINGTON.

GATE.

1,095,924.  Specification of Letters Patent.  Patented May 5, 1914.

Application filed October 3, 1913. Serial No. 793,214.

*To all whom it may concern:*

Be it known that I, FRANCIS MARRION PLUMMER, a citizen of the United States, residing at Lyle, in the county of Klickitat and State of Washington, have invented new and useful Improvements in Gates, of which the following is a specification.

This invention relates to improvements in gates and latching means therefor and consists in the construction, combination and arrangement of devices hereinafter described and claimed.

One object of the invention is to effect improvements in the construction of the gate so that when the gate is in closed position a portion or rearward extension of the inner end of the gate extends over and above the fence line.

Another object is to provide an improved gate which is adjustable vertically so that it may be raised to enable it to be used over snow and then be lowered to normal position after the snow melts.

Another object is to provide improved means for latching the gate when the latter is in any adjusted position.

Another object is to provide means for opening the gate from either side, and in the direction in which the person using the gate is moving, so that if the person is driving or riding the gate moves away from the horse or team when opening; another object being to cause the gate latching means to be actuated by the gate opening and closing means.

In the accompanying drawings: Figure 1 is a perspective view of a gate constructed in accordance with my invention showing the same in closed position. Fig. 2 is a detail elevation of the same showing the gate in lowered position in full lines and in elevated position in dotted lines. Fig. 3 is a detail horizontal sectional view of the keepers or latches on the plane indicated by the line 3—3 of Fig. 2. Fig. 4 is a detail vertical transverse sectional view of the same on the plane indicated by the line 4—4 of Fig. 2.

The gate 1 is a swing gate and is here shown as balanced and mounted on a post or rod 2, which in practice is preferably a pipe of suitable length and diameter. This pipe or balancing post is usually 8 feet long and an inch in diameter and its lower end is screwed or driven through an anchor block 3 and buried in the ground at a depth of about 18 inches. The post against which the gate closes is indicated at 4 and is on the opposite side of the driveway from the post 2. The gate comprises an upper bar 5, a lower bar 6, and an intermediate bar 7, the said bars being connected together by an upright 8 which is arranged near the post 2 and by an upright 9 which is arranged at the free end of the gate. An inclined brace 10 is also preferably provided. The bars 6 and 7 terminate near the upright 8 which is near the post or rod 2 but the bar 5 extends rearwardly or inwardly beyond the said upright 8 so that a space is formed under the said bar 5 and at the inner end of the gate into which space the fence line 11 may extend so that the fence may be run almost to the pivoting or balancing post 3 and the inner end or extension of the bar 5 may be caused to swing above the fence, and, when the gate is closed to lie in line with the fence and above the same.

The gate is mounted on the post 2 for vertical adjustment as well as for swinging or pivotal movement, and hence the gate may be raised and lowered as required to enable it to be used over snow. To support the gate at any desired vertical adjustment I provide a collar 15 which is arranged and is vertically movable on the post 2, below the gate and is secured to the post at any desired vertical adjustment by means of a set screw 16. A washer 17 is interposed between the collar and the bottom of the gate as shown.

A pair of keepers or latches 13 and 14 are arranged for horizontal longitudinal movement on opposite sides of the gate and at the free end thereof, each latch or keeper being provided with a longitudinal slot 15' and being mounted and supported for horizontal longitudinal movement by bolts or other suitable devices 16 which also engage the bar 7. A spring 17' is connected to the latch or keeper 13 to project the same and a similar spring 18 fills a corresponding office for the latch or keeper 14. The latch 13 is beveled on its outer side at its outer end as at 19 to form a cam surface and the latch 14 is correspondingly but reversely beveled as at 20. Spaced from opposite sides of the post 2 and arranged on the same side of the road or driveway therewith are a pair of guide posts 26 and 27 the upper ends of which are here shown connected to the upper end of the post 2 by means of braces 28. When the gate is opened in one direction it moves to the post 26 and when opened in the reverse direction it moves to the post 27. An operating cord 37 is attached to the latch 14, passes over a pulley 38 on the gate, then leads rearwardly therefrom over a guide pulley 39 on one end of the cross bar 36 on the projecting arm 5ª of the gate and then leads over a pulley 41 on the post 26 the free end of the said operating cord hanging from the pulley 41. A similar cord is attached to the latch 13, leads over pulleys 44 and 45 on the gate and then over a pulley 47 on the post 27.

The operation of the invention is as follows: Let it be assumed, that a person driving, approaches the gate from the side on which the post 26 is located and that the gate is closed against the post 4 and the opposite sides of said post are engaged by the projecting ends of the latches 13 and 14. When the post 26 is reached he pulls down on the cord 37 and this may be done without dismounting. Such pull on the cord 37 causes said cord to withdraw the latch 14, against the tension of its spring and release the gate from the post 4 and also cause the gate to swing toward the post 27 and away from the horse or team or in other words in the same direction in which the horse or team are moving and such movement of the gate does not frighten the horse or team. As the gate moves against the post 27 its latch 13 strikes at its outer end against said post and its beveled cam causes it to be moved inwardly against the tension of its spring thus permitting said latch to pass said post 27 and said latch is then projected by its spring so that both the latches become arranged on opposite sides of the post 27 and hence the gate becomes latched in open position. After passing through the gateway and when reaching the cord 43 hanging from the pulley 47 on the post 27 the person using the gate draws down on said cord, thus causing the latch 13 to be tripped from the post 27 and the gate to be swung back to closed position against the post 4 and said post becomes engaged and held between the latches. When the gate is operated by a person approaching it from the side on which the post 27 is located the gate becomes swung against and latched to the post 26 by the operation of the cord 43 and the latches as will be understood. It will be observed that the latches will engage either one of the posts, 4, 26 and 27 at all vertical adjustments of the gate.

While I have herein shown and described the preferred form of my invention, I would have it understood that changes may be made in the form, proportion and construction of the several parts without departing from the spirit of the invention and within the scope of the appended claim.

Having thus described my invention, I claim:

The combination of a gate mounted for swinging movement in a horizontal plane and having a rearwardly projecting arm provided with a cross bar at its rear end, said cross bar being provided with pulleys, a post against which the gate may close, guides and posts at opposite sides of the gate, a pair of spring projecting latches at the free end and on opposite sides of the gate to engage opposite sides of either of said posts, each latch having a cam face to cause the same to be moved inwardly when engaged by one of the posts and also having a longitudinal guide slot, supporting bolts for the latches arranged in the guide slots thereof and extending through the gate, and separate operating cords for the said latches, each operating cord being attached to one of the latches, engaged with one of the pulleys of the cross bar and also engaged with one of the guides opposite one side of the gate.

In testimony whereof I affix my signature in presence of two witnesses.

FRANCIS MARRION PLUMMER.

Witnesses:
L. H. LAWSON,
J. E. FOSS.

---

Copies of this patent may be obtained for five cents each, by addressing the "Commissioner of Patents, Washington, D. C."